US011205288B2

(12) United States Patent
Fine et al.

(10) Patent No.: US 11,205,288 B2
(45) Date of Patent: Dec. 21, 2021

(54) GRAPHICS PROCESSOR AND RELATED METHOD FOR DISPLAYING A SET OF PIXEL(S), RELATED PLATFORM AND AVIONICS SYSTEM

(71) Applicant: Thales, Courbevoie (FR)

(72) Inventors: Alexandre Fine, Merignac (FR); Eric Filliatre, Merignac (FR); Nicolas Levasseur, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/901,821

(22) Filed: Jun. 15, 2020

(65) Prior Publication Data

US 2021/0082166 A1 Mar. 18, 2021

(30) Foreign Application Priority Data

Sep. 16, 2019 (FR) ...................................... 19 06704

(51) Int. Cl.
*G06T 11/20* (2006.01)
*B64D 43/00* (2006.01)
*G06T 1/20* (2006.01)
*G06T 11/60* (2006.01)

(52) U.S. Cl.
CPC ............ *G06T 11/203* (2013.01); *B64D 43/00* (2013.01); *G06T 1/20* (2013.01); *G06T 11/60* (2013.01)

(58) Field of Classification Search
CPC ....... G06T 11/40; G06T 11/203; G06T 17/00; G06T 11/001; G06T 11/00
USPC ........................................................ 345/441
See application file for complete search history.

(56) References Cited

U.S. PATENT DOCUMENTS

| 5,480,305 A * | 1/1996 | Montag ................. G06T 11/001 342/26 R |
| 6,441,833 B1 * | 8/2002 | Anderson ............. G06F 9/4484 715/762 |
| 9,703,476 B1 * | 7/2017 | Pappas ................ G06F 3/04847 |
| 10,169,840 B2 | 1/2019 | Viggers et al. |
| 2005/0253855 A1 * | 11/2005 | Hutchins ............... G06T 15/005 345/506 |
| 2015/0062142 A1 * | 3/2015 | Goel ..................... G06T 15/005 345/582 |
| 2016/0071231 A1 | 3/2016 | Barch et al. |
| 2017/0177458 A1 | 6/2017 | Viggers et al. |
| 2018/0293701 A1 * | 10/2018 | Appu ........................ G06T 1/60 |

OTHER PUBLICATIONS

French Search Report issued by the French Patent Office in French Patent Application No. 1906704, dated Jan. 21, 2020.

\* cited by examiner

*Primary Examiner* — Gordon G Liu

(74) *Attorney, Agent, or Firm* — Arent Fox LLP

(57) ABSTRACT

This graphics processor comprises:
a generating module configured to generate at least one set of pixel(s) to be displayed;
a display module connected to the generating module, the display module being configured to display each set of pixel(s) on a screen; and
a monitoring unit integrated into the generating module, the monitoring unit being configured to determine a list of graphic context information item(s) for at least one pixel and to deliver said list to an external electronic supervision device, able to be connected to the graphics processor.

11 Claims, 3 Drawing Sheets

GRAPHICS PROCESSOR AND RELATED METHOD FOR DISPLAYING A SET OF PIXEL(S), RELATED PLATFORM AND AVIONICS SYSTEM

CROSS-REFERENCE TO RELATED APPLICATIONS

This application is a U.S. non-provisional application claiming the benefit of French Application No. 19 06704, filed on Jun. 21, 2019, which is incorporated herein by reference in its entirety.

FIELD

The present invention relates to a graphics processor comprising a module for generating at least one set of pixel(s) to be displayed and a module for displaying each set of pixel(s) on a screen, the display module being connected to the generating module.

The invention also relates to a platform comprising a graphics processor and a central processor, the graphics processor being connected to the central processor.

The invention also relates to an avionics system intended to be embedded in an aircraft, the avionics system comprising such a platform and an electronic device for supervising the platform, connected to the platform.

The invention also relates to a method for displaying pixel(s) on a screen, the method being implemented by such a graphics processor.

The invention relates to the field of data display systems, preferably suitable for being embedded in an aircraft, in particular in an aircraft cockpit.

The invention in particular relates to the field of graphics processors included in these display systems, these graphics processors also being called GPU (Graphic Processing Unit). Such graphics processors are typically made in the form of one or several dedicated integrated circuits, such as one or several ASIC (Application-Specific Integrated Circuit), or in the form of one or several programmable logic components, such as one or several FPGA (Field-Programmable Gate Array).

Each graphics processor is generally connected to a central processor to form a platform, the central processor generally being called CPU (Central Processing Unit).

BACKGROUND

A graphics processor is then known of the aforementioned type for which the monitoring of correct running of the implemented processor is generic monitoring. Such generic monitoring seeks to verify that the graphics processor is running correctly, independent of computations or processing done by the graphic processor. The generic monitoring is for example based on a predefined list of failure modes.

However, such monitoring is not always appropriate, in particular with the predefined list of failure modes generally not being exhaustive.

Furthermore, such generic monitoring is sometimes difficult to implement, due to the complexity of such a graphic processor. This complexity is typically due to the levers making it possible to increase the performance of a graphic processor.

Conventionally, the levers making it possible to increase the performance of a central processing unit or CPU are increasing the frequency, with the impacts on increasing electricity consumption and heat production; increasing the complexity of the processing done, with specialized operations, code execution predictive logic, preloading logic for cache memories; increasing the number of computing cores in the case of a multicore processor and introducing a parallelism into instructions and data. Overall, a complexity factor of 2 on a processor only leads to a performance gain factor of 1.4.

Another lever makes it possible to increase the performance of a graphics processor, and contributes to its complexity. This other lever is the introduction of a thread, with the transition from a multicore approach for the central processor to an approach based on a large number of elementary cores or processors for the graphics processor, typically more than 100 elementary cores or processors. As an illustration regarding the theoretical gains in performance, two elementary processors yield a performance gain factor of 1.8, which is better than the aforementioned performance gain factor for the central processor. Gains in consumable electrical material are also observed.

In general, the design of a graphics processor based on the parallelization of a large number of elementary processors allows simultaneous memory access with an adequate organization of memory resources, an increase in bandwidth without impact on access lags, and improved robustness.

Beyond the complexity of the electronic architecture involving a massive parallelization of computing and memory resources, a second complexity factor of the graphics processor originates from the difficulty of programming parallel algorithms, which is required to take advantage of the electronic architecture. This programming in particular requires maximizing the breakdown of tasks to be performed by the graphics processor, for an optimal parallel execution; coordinating tasks, to avoid waiting; and monitoring excess costs regarding data exchanges and/or additional computations.

The generic monitoring of such a graphics processor is therefore often complex and difficult to perform.

SUMMARY

The aim of the invention is then to propose a graphics processor offering better monitoring of its operation.

To that end, the invention relates to a graphics processor, comprising:
  a generating module configured to generate at least one set of pixel(s) to be displayed;
  a display module connected to the generating module, the display module being configured to display each set of pixel(s) on a screen; and
  a monitoring unit integrated into the generating module, the monitoring unit being configured to determine a list of graphic context information item(s) for at least one pixel and to deliver said list to an external electronic supervision device, able to be connected to the graphics processor.

Thus, the graphics processor according to the invention makes it possible, owing to its monitoring unit integrated into the generating module, to determine a list of graphic context information item(s) for at least one pixel, then to deliver said list to an external supervision device. The list of graphic context information item(s) then provides additional information on the running of the graphics processor, in particular on the display of one or several pixels of the set of pixel(s) to be displayed.

This list of graphic context information item(s) then makes it possible to perform real monitoring of the running of the graphics processor, in addition to the generic monitoring of the state of the art.

According to other advantageous aspects of the invention, the graphics processor comprises one or more of the following features, considered alone or according to all technically possible combinations:

- each set of pixel(s) includes a plurality of pixels corresponding to a group of geometric primitive(s) with characteristic points, and the monitoring unit is configured to determine a list of graphic context information item(s) for at least one of the pixels corresponding to said characteristic points;
- the monitoring unit is configured to determine a list of graphic context information item(s) only for the pixels corresponding to said characteristic points;
- the generating module includes a geometric engine able to generate at least one group of geometric primitive(s) and a rendering engine able to convert each group of geometric primitive(s) into a respective set of pixel(s), the monitoring unit preferably being integrated into the rendering engine;
- each geometric primitive is chosen from the group consisting of: a segment, an arc of circle, a Bézier curve and a polygon;
- each geometric primitive preferably being a segment with two ends or a polygon with apices, the end of the segment or the apices of the polygon forming respective characteristic points;
- each list of graphic context information item(s) comprises one or several information items chosen from the group consisting of: an identifier of the monitored pixel, a visibility information item of the pixel on the screen; a position information item of the pixel; a texture information item of the pixel; and a color information item of the pixel;
- at least one list of graphic context information item(s) further comprises a functional information item characterizing a function associated with the monitored pixel;
- each function preferably being chosen from the group consisting of: a horizon line, a needle position on a dial, a scale graduation, a scale cursor, an alphanumeric character segment, and a mesh point of a scene; and
- the generating module is configured to generate at least one intermediate image layer, each intermediate layer including a respective set of pixel(s), and the graphic processor further comprises a composition module configured to make up an image from the intermediate layer(s) generated by the generating module, the display module then being able to display the image made up by the composition module.

The invention also relates to a platform comprising a graphics processor and a central processor, the graphics processor being connected to the central processor and as defined above.

The invention also relates to an avionics system intended to be embedded in an aircraft, the avionics system comprising an avionics platform and an electronic device for supervising the platform, connected to the platform, the avionics platform being a platform as defined above.

The invention also relates to a method for displaying pixel(s) on a screen, the method being implemented by a graphics processor and comprising:

- generating at least one set of pixel(s) to be displayed;
- monitoring each set of pixel(s), with the determination of a list of graphic context information item(s) for at least one pixel and the delivery of said list to an external electronic supervision device, which is able to be connected to the graphics processor; and
- displaying each set of pixel(s) on the screen.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
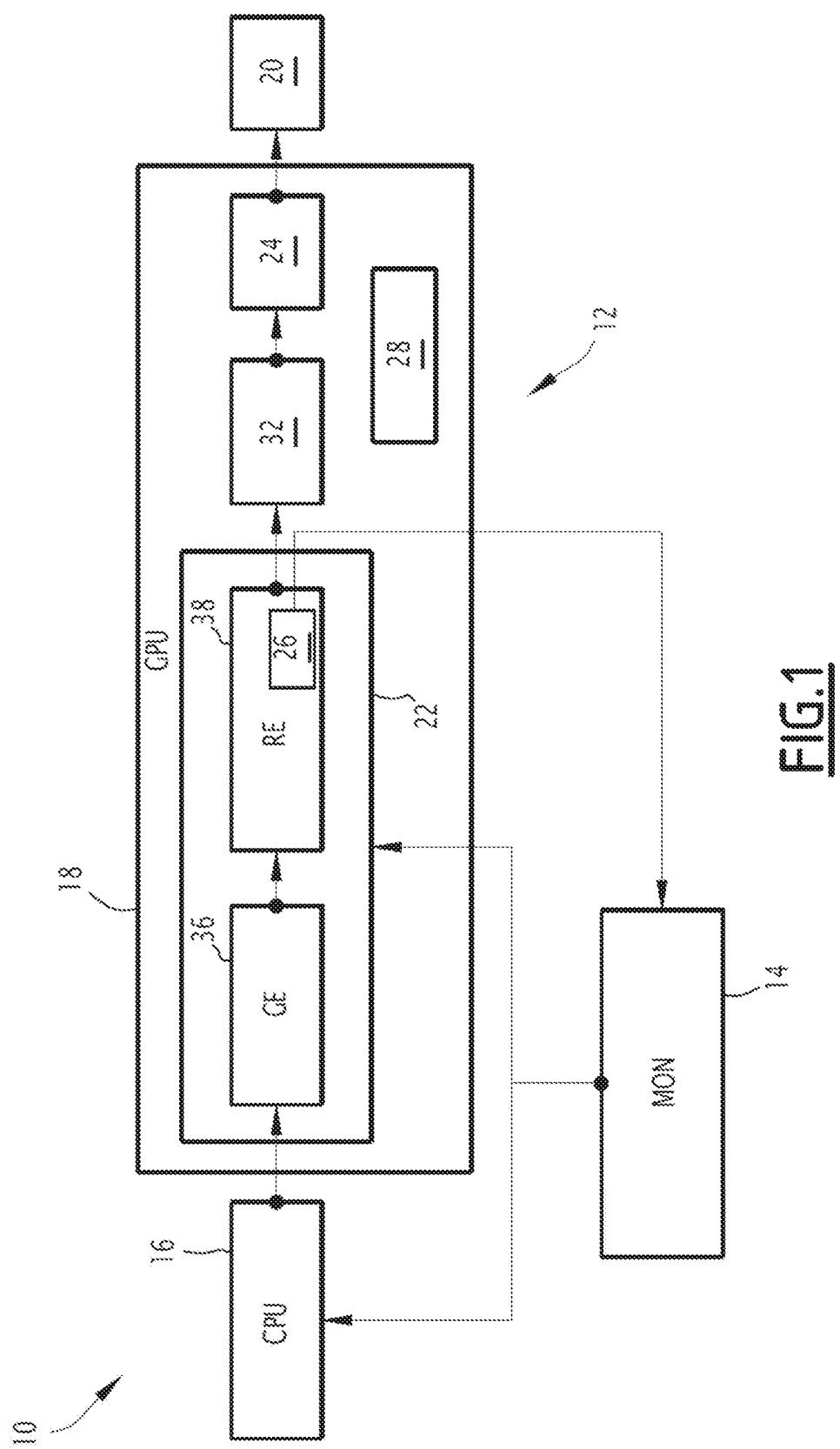
FIG. 1 is a schematic illustration of an avionics system according to the invention, intended to be embedded in an aircraft and comprising an avionics platform and an electronic supervision device of the platform, the platform including a central processing unit and a graphics processor connected to the central processor.

In FIG. 1, an avionics system 10 comprises an avionics platform 12 and an electronic supervision device 14 of the platform 12, the supervision device 14 being connected to the platform 12. The avionics system 10 is intended to be embedded in an aircraft, not shown.

The avionics platform 12 comprises a central processing unit (CPU) 16 and a graphics processor 18, also called graphic processing unit (GPU), the graphics processor 18 being connected to the central processing unit 16.

In addition, the platform 12 comprises a display screen 20, for example connected to the graphics processor 18.

The supervision device 14 is an electronic device outside the graphics processor 18 and able to be connected to said graphics processor 18. In the example of FIG. 1, the supervision device 14 is connected to the graphics processor 18.

The supervision device 14 is generally configured to supervise the proper running of the platform 12, and in particular of the graphics processor 18. The supervision device 14 is also called MON (Monitor). The supervision device 14 is in particular able to receive, from the graphics processor 18, information relative to the running of said graphics processor 18.

In addition, the supervision device 14 is also able to receive information relative to the running of the central processing unit 16. As an optional addition, the supervision device 14 is also able to send command instructions to the central processing unit 16 and/or to the graphics processor 18.

The central processing unit 16 is known in itself. The central processing unit 16 is a single-core processor or a multicore processor.

The graphics processor 18 comprises a module 22 for generating at least one set of pixel(s) to be displayed and a module 24 for displaying each set of pixel(s) on the display screen 20, the display module 24 being connected to the generating module 22.

The graphics processor 18 further comprises a monitoring unit 26 integrated into the generating module 22, and a data storage memory 28.

The generating module 22 is configured to generate at least one set of pixel(s) to be displayed.

Figure 2:
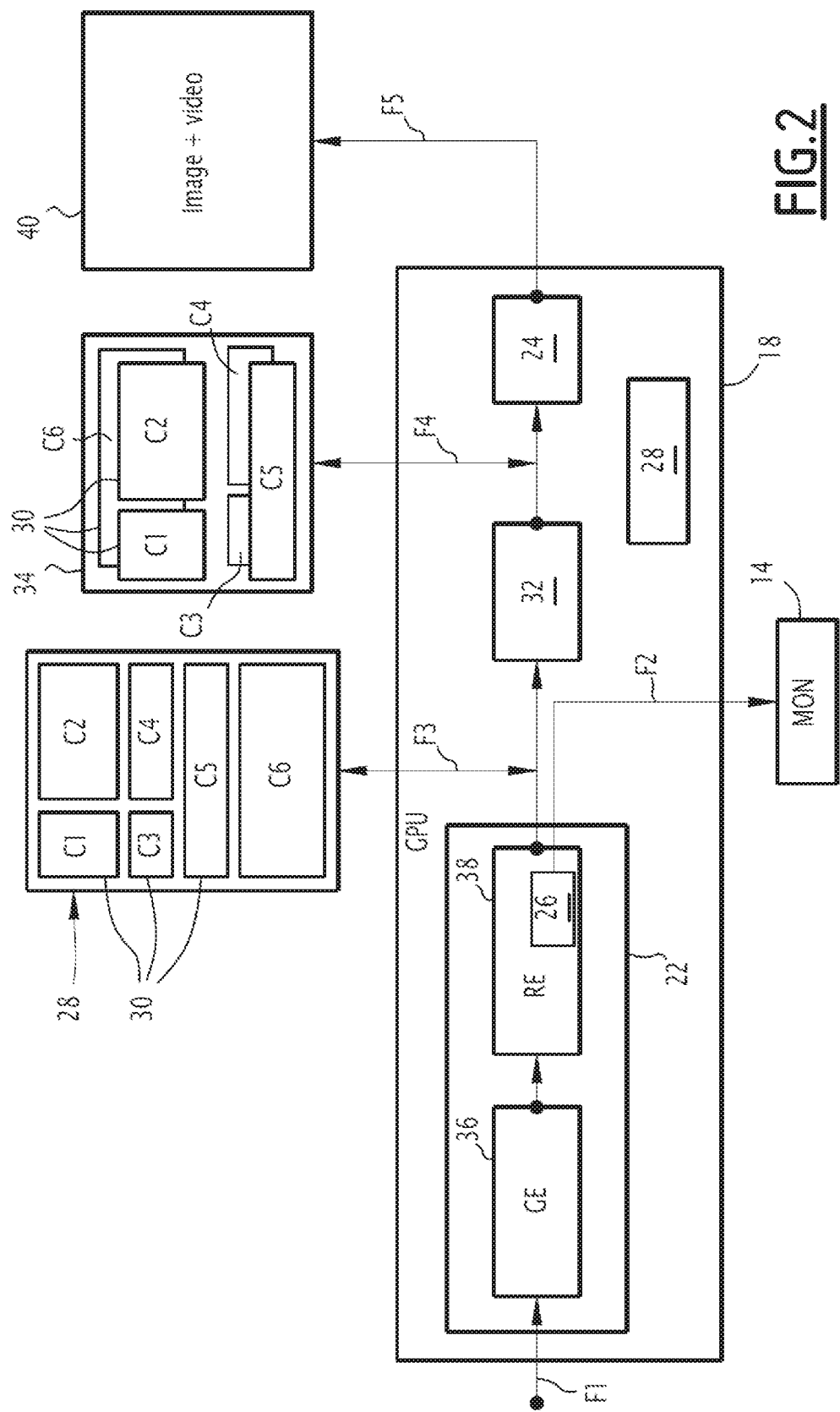
FIG. 2 is a schematic illustration of objects successively processed by the graphics processor of FIG. 1.

As an optional addition, the generating module 22 is configured to generate at least one intermediate layer 30 of images, visible in FIG. 2, each intermediate layer 30 including a respective set of pixel(s).

According to this optional addition, the graphics processor 18 further comprises a composition module 32 for composing an image 34 from the intermediate layer(s) 30 generated by the generating module 22, the display module 24 then being able to display the image 34 composed by the composition module 32.

The generating module 22 for example includes a geometric engine 36 able to generate at least one group of geometric primitive(s) and a rendering engine 38 able to convert each group of geometric primitive(s) into a respective set of pixel(s). According to this example, the monitoring unit 26 is preferably integrated into the rendering engine 38. The geometric engine 36 is also called GE, and the rendering engine 38 is also called RE (which may also stand for Raster Engine).

The generating module 22, and as an optional addition the composition module 32, form a graphic creation chain of a respective image 34, which may be displayed on the screen 20 by the display module 24. The graphic creation chain is also called graphic pipeline, and the monitoring unit 26 according to the invention is then integrated into, or intrinsic to, said graphic pipeline.

The display module 24 is configured to generally display each set of pixel(s) on the screen 20, in particular to display each image 34 on the screen 20.

As an optional addition, the display module 24 is also configured to mix a respective image 34 with a video, for example stored in the storage memory 28, then to display the mix 40 of the image and the video on the display screen 20.

The monitoring unit 26 is configured to determine a list of graphic context information item(s) for at least one pixel and to deliver said list to of graphic context information item(s) to the external electronic supervision device 14.

Each set of pixel(s) includes a plurality of pixel(s) corresponding to a group of geometric primitive(s) with characteristic points, and the monitoring unit 26 is then configured to determine a respective list of graphic context information item(s) for at least one of the pixels corresponding to said characteristic point.

Preferably, the monitoring unit 26 is configured to determine a respective list of graphic context information item(s) only for the pixels corresponding to said characteristic point.

Each geometric primitive is for example chosen from the group consisting of: a segment, an arc of circle, a Bézier curve and a polygon.

Each geometric primitive is preferably a segment, that is to say, a line segment, with two ends, or a polygon with apices, and the ends of the segment or the apices of the polygon then form respective characteristic points for which the monitoring unit 26 is able to determine a list of graphic context information item(s).

When, as an optional addition, the generating module 22 includes the geometric engine 36 and the rendering engine 38, each geometric primitive is generated by the geometric engine 36, then converted by the rendering engine 38 into corresponding pixels.

Each list of graphic context information item(s) comprises one or several information items chosen from the group consisting of: an identifier of the monitored pixel; a visibility information item of the pixel on the screen 20; a position information item of the pixel; a texture information item of the pixel; and a color information item of the pixel.

Each list of graphic context information item(s) preferably comprises at least the following information items: the identifier of the monitored pixel and the position information of the pixel, such as the coordinates of the pixel in a coordinate system associated with the screen 20, also called screen memory coordinate system. The identifier of the monitored pixel is an identifier referencing said monitored pixel among all of the monitored pixels, and next allowing the supervision device 14 to perform the supervision of these pixels based on each respective identifier.

The screen memory coordinate system is a coordinate system used at the output of the generating module 22, for example the coordinate system used after all of the graphic transformations have been applied by the geometric engine 36, then by the rendering engine 38.

Each list of graphic context information item(s) further preferably comprises one or several graphic attributes of the pixel, that is to say, the texture information of the pixel, such as a texture identifier, the color information of the pixel, such as a color of the pixel, and the visibility information of the pixel, such as a depth of the pixel.

The texture identifier makes it possible to identify the texture associated with the pixel among a group of possible textures.

The color of the pixel is for example expressed in the form of an RGB (Red Green Blue) code. In a variant, the color is expressed in the form of an sRGB code.

The depth is an indicator making it possible to indicate the depth at which the pixel is located in a stack of intermediate layers 30 forming a respective image 34, the visibility of the pixel on the screen then resulting from this depth. In other words, the depth of the pixel in the stack of layers is a priority information item making it possible to determine whether the corresponding pixel will be displayed during the composition of the intermediate layers 30 in order to obtain the composed image 34.

As an optional addition, at least one list of graphic context information item(s) further comprises a functional information item characterizing a function associated with the monitored pixel. Each function is for example chosen from the group consisting of: a horizon line, a needle position on a dial, a scale graduation, a scale cursor, an alphanumeric character segment, and a mesh point of a scene. The scene is typically a two-dimensional or three-dimensional scene, also called 2D scene or 3D scene.

The functional information item then allows the supervision device 14 to determine whether the monitored pixel belongs to a horizon line, respectively to a graduation indicating a needle position in a dial, respectively to a scale graduation, respectively to a scale cursor, respectively to an alphanumeric character segment, and more generally to an alphanumeric character, or further respectively to a mesh of a scene, such as a 2D or 3D scene.

In other words, when this functional information item is included in the list of graphic context information item(s) for the monitored pixel, it allows the supervision device 14 additionally to determine the identifier and the position of the monitored pixel, as well as any graphic attributes, the function of the monitored pixel in terms of information displayed on the screen 20.

In order to deliver the list of graphic context information item(s) to the supervision device 14, the monitoring unit 26 is for example configured to record said list in a buffer memory, also accessible by the supervision device 14.

One skilled in the art will further understand that each list of graphic context information item(s) is determined by the monitoring unit 26 for a pixel about to be displayed on the screen 20, this determination of the list of graphic context information item(s) being done just before the display of the corresponding set of pixel(s) on the screen 20, or just before the composition of the image 34 from the intermediate layer(s) 30, when, as an optional addition, the graphic processor 18 further comprises the composition module 32.

In particular, when the generating module 22 includes the geometric engine 36 and the rendering engine 38, the monitoring unit 26 is preferably integrated into the rendering engine 38, and the determination of each list of graphic context information item(s) is then done after converting each group of geometric primitive(s) into a respective set of pixel(s).

The storage memory 28 is connected to each of the modules of the graphic processor 18, in particular to the generating module 22 and the display module 24, and, as an optional addition, the composition module 32.

The composition module 32 is configured to compose each image 34 from the corresponding intermediate layer(s) 30, in particular by positioning said intermediate layer(s) 30, for example relative to one another, and superimposing them if applicable, as will be described in more detail hereinafter with respect to FIG. 2.

The geometric engine 36, or GE, is configured to generate at least one group of geometric primitive(s), that is to say, to generate a vectoral image portion.

The rendering engine 38 is next configured to convert each group of geometric primitive(s) into a respective set of pixel(s), that is to say, to convert the vectorially image portion corresponding to the group of geometric primitive(s) into a matrix image portion corresponding to said set of pixel(s). This conversion done by the rendering engine 38 is also called rasterization.

Figure 3:
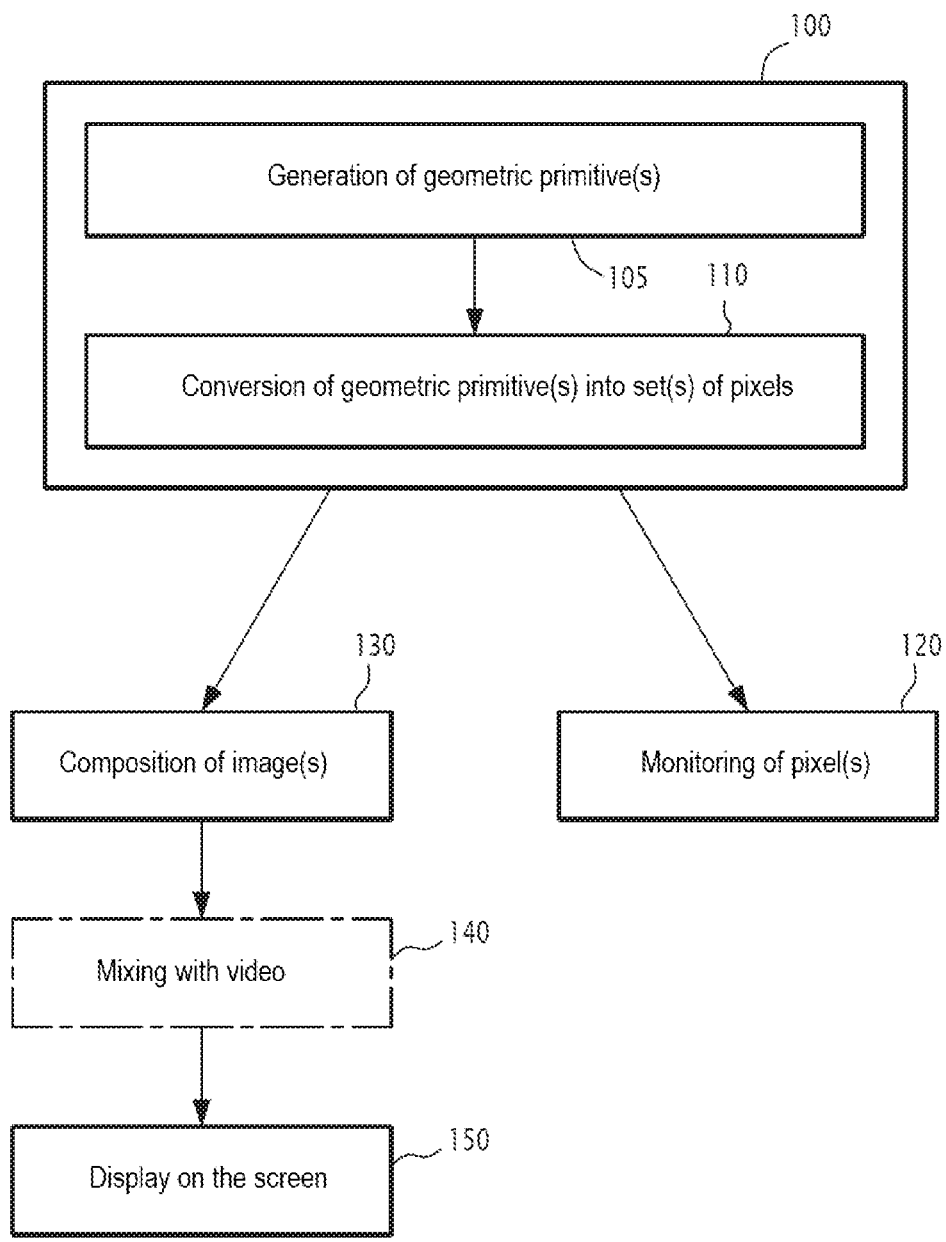
FIG. 3 is a flowchart of a display method according to the invention, the method being carried out by the graphics processor of FIG. 1.

The operation of the avionics system 10 according to the invention, and in particular of the graphics processor 18, will now be explained using FIG. 3, showing a flowchart of the method for displaying pixel(s) on the screen 20, implemented by the graphics processor 18, as well as in light of FIG. 2, illustrating objects successively processed by the graphics processor 18.

During an initial step 100, the graphics processor 18 generates, via its generating module 22, at least one set of pixel(s) to be displayed on the screen 20.

In the example of FIGS. 1 and 2, where the generating module 22 includes the geometric engine 36 and the rendering engine 38, the generating step 100 includes a sub-step 105 for generating geometric primitive(s) carried out by the geometric engine 36, also denoted GE, followed by a sub-step 110 for converting the generated geometric primitive(s) into one or several respective sets of pixel(s), this conversion sub-step 110 being carried out by the rendering engine 38, also denoted RE.

Furthermore, prior to the generating step 100 and as shown by the arrow F1 in FIG. 2, the generating module 22 has received, for each pixel to be monitored, the identifier of said pixel, for example from the central processor 16 or from the supervision device 14.

Further to this generating step 100, the graphics processor 18 performs, on the one hand, a step 120 for monitoring each generated set of pixel(s), this monitoring step 120 being carried out by the monitoring unit 26 from each generated set of pixel(s), and on the other hand, an image 34 composition step 130, this composition step 130 being carried out by the composition module 32.

The monitoring step 120 then includes, for each monitored pixel, the determination of a respective list of graphic context information item(s), then the delivery of said list to the external supervision device 14, as shown by arrow F2 in FIG. 2.

As previously described, each list of graphic context information item(s) preferably comprises the identifier of the monitored pixel and the position information of said pixel, such as its coordinates in three dimensions (x, y, z) in the screen memory coordinate system.

In addition, the list of graphic context information item(s) further comprises one or several graphic attributes, such as the texture identifier, the color or the depth of the monitored pixel.

Also in addition, the list of graphic context information items comprises the functional information for the monitored pixel, this functional information for example making it possible to indicate that the monitored pixel belongs to a horizon line, a needle position on a dial, a scale graduation, a scale cursor, an alphanumeric character or a scene mesh.

In parallel with the delivery of said list of graphic context information items for each pixel monitored at the supervision device 14, the graphic processor 18 composes, during step 130 and via its composition module 32, each image 34 from the generated intermediate layers 30.

In the example of FIG. 2, the composition module 32 receives a batch of generated intermediate layers 30 from the generating module 22, as shown by the arrow F3, the intermediate layers 30 being denoted C1 to C6 in this example, then the composition module 32 composes the image 34 from these intermediate layers 30 and delivers the composed image 34 to the display module 24, as shown by the arrow F4 in FIG. 2. This composition of images 34 typically consists of a positioning of the intermediate layers 30, denoted C1 to C6, relative to one another, as well as a superposition of certain layers on top of one another.

The composition step 130 is optionally followed by a mixing step 140 during which the graphic processor 18 mixes, via its display module 24, also serving as mixing module, an image 34 composed by the composition module 32 with a video, or a video feed, stored in the storage memory 28, in order to display, during the following step 150, the mix 40 of an image and a video, as shown by the arrow F5 in FIG. 2.

Of course, in the absence of the mixing step 140, the display module 24 then displays the composed image(s) 34 on the screen 20 during the display step 150.

One skilled in the art will further understand that in the example of FIG. 2, the arrows F3 and F4 serve solely to illustrate the type of data processed between the generating module 22 and the composition module 32 on the one hand, then between the composition module 32 and the display module 24 on the other hand. The arrows F3 and F4 therefore do not show data that would be delivered by the graphics processor 18 to an external device with respect to the graphics processor 18.

One skilled in the art will likewise understand that, in order to simplify the drawing, the intermediate layers 30 and the composed image 34 are shown outside the graphics processor 18 in FIG. 2, whereas they are of course processed inside the graphics processor 18, the intermediate layers 30 generated by the generating module 22 for example being stored in the storage memory 28 so as next to be used by the composition module 32 in order to compose each respective image 34.

In FIG. 2, the arrows F2, and respectively F5, show data coming from the graphics processor 18. The arrow F2 corresponds to the respective lists of graphic context information item(s) delivered for the monitored pixels, by the monitoring unit 26 to the supervision device 14. The arrow F5 shows the mix 40 of images and video, or in a variant, the image, delivered to the display screen 20 at the output of the graphics processor 18, in order to be displayed on the screen.

The monitoring unit 26 then makes it possible to perform real monitoring of the working of the graphics processor 18, the monitoring unit 26 delivering, for each monitored pixel, the respective list of graphic context information item(s) to the supervision device 14, and this list of graphic context information item(s) providing the supervision device 14 with information relative to each monitored pixel just before it is displayed on the screen 20, or just before the composition of images 34.

Each list of graphic context information item(s) is in particular determined after all of the transformations carried out by the geometric engine 36, then by the rendering engine 38, have been applied. The monitoring of each pixel, offered by the monitoring unit 26, is then representative of what will be displayed on the screen 20 for each monitored pixel, and the monitoring is then said to be real.

Furthermore, the monitoring unit 26 is integrated directly into the generating module 22, which makes it possible to perform this monitoring of pixel(s), via the determination of the respective list of graphic context information item(s) for each monitored pixel, just after the generation of said pixel. This monitoring is therefore less complex and easier to carry out than the generic monitoring of the graphic processor of the state of the art.

From the identifier of each monitored pixel, received as input of the graphic processor 18, and in particular as input of the generating module 22, the monitoring unit 26 develops the list of graphic context information item(s) by including, in addition to said identifier, at least one information item among the position information of the pixel, and one or several graphic attributes, such as the visibility information, the texture information and the color information of the monitored pixel. As previously indicated, the information included in the list of graphic context information item(s), in addition to the identifier of the monitored pixel, is preferably the position of said pixel, and the graphic attribute(s) are then optional.

It is thus evident that the graphic processor 18 according to the invention allows better monitoring of its working, and that the avionics system 10 according to the invention then offers safer running with the supervision device 14, which performs effective supervision of the running of the graphics processor 18, using the list of graphic context information items delivered by the monitoring unit 26 for each monitored pixel.

The invention claimed is:

1. A graphics processor, comprising:
a generating module configured to generate at least one set of pixel(s) to be displayed, wherein the generating module includes a geometric engine configured to generate at least one group of geometric primitive(s) and a rendering engine configured to convert each group of geometric primitive(s) into a respective set of pixel(s);
a display module connected to the generating module, the display module being configured to display each set of pixel(s) on a screen;
a monitoring unit integrated into the rendering engine of the generating module, the monitoring unit being configured to determine a list of graphic context information item(s) for at least one pixel and to deliver said list to an external electronic supervision device for external monitoring of the graphics processor when the external electronic supervision device is communicatively coupled with the graphics processor,
wherein each list of graphic context information item(s) comprises one or several information items chosen from the group consisting of: an identifier of the monitored pixel, a visibility information item of the pixel on the screen; a position information item of the pixel; a texture information item of the pixel; and a color information item of the pixel.

2. The graphics processor according to claim 1, wherein each set of pixel(s) includes a plurality of pixels corresponding to a group of geometric primitive(s) with characteristic points, and the monitoring unit is configured to determine a list of graphic context information item(s) for at least one of the pixels corresponding to said characteristic points.

3. The graphics processor according to claim 2, wherein the monitoring unit is configured to determine a list of graphic context information item(s) only for the pixels corresponding to said characteristic points.

4. The graphics processor according to claim 2, wherein each geometric primitive is chosen from the group consisting of: a segment, an arc of circle, a Bézier curve and a polygon.

5. The graphics processor according to claim 4, wherein each geometric primitive is a segment with two ends or a polygon with apices, the end of the segment or the apices of the polygon forming respective characteristic points.

6. The graphics processor according to claim 1, wherein at least one list of graphic context information item(s) further comprises a functional information item characterizing a function associated with the monitored pixel.

7. The graphics processor according to claim 6, wherein each function is chosen from the group consisting of: a horizon line, a needle position on a dial, a scale graduation, a scale cursor, an alphanumeric character segment, and a mesh point of a scene.

8. The graphics processor according to claim 1, wherein the generating module is configured to generate at least one intermediate image layer, each intermediate layer including a respective set of pixel(s), and the graphic processor further comprises a composition module configured to make up an image from the intermediate layer(s) generated by the generating module, the display module then being able to display the image made up by the composition module.

9. A platform comprising a graphics processor and a central processor, the graphics processor being connected to the central processor,
wherein the graphics processor is according to claim 1.

10. An avionics system intended to be embedded in an aircraft, the avionics system comprising an avionics platform and an electronic device for supervising the platform, connected to the platform,
wherein the platform is according to claim 9.

11. A method for displaying pixel(s) on a screen, the method being implemented by a graphics processor and comprising:
generating, by a generating module, at least one set of pixel(s) to be displayed, wherein the generating comprises generating, by a geometric engine of the generating module, at least one group of geometric primitive(s) and converting, by a rendering engine of the generating module, each group of geometric primitive(s) into a respective set of pixel(s);
monitoring, by a monitoring unit integrated into the rendering engine of the generating module, each set of pixel(s), with the determination of a list of graphic context information item(s) for at least one pixel and the delivery of said list to an external electronic supervision device for external monitoring of the graphics processor when the external electronic supervision device is communicatively coupled with the graphics processor; and displaying, by a display module connected to the generating module, each set of pixel(s) on the screen, wherein each list of graphic context information item(s) comprises one or several information items chosen from the group consisting of: an identifier of the monitored pixel, a visibility information item of the pixel on the screen; a position information item of the pixel; a texture information item of the pixel; and a color information item of the pixel.

* * * * *